(12) United States Patent
Fleming

(10) Patent No.: US 6,281,488 B1
(45) Date of Patent: Aug. 28, 2001

(54) FIBER OPTIC COUPLED OPTICAL SENSOR

(75) Inventor: Kevin J. Fleming, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/209,314

(22) Filed: Dec. 9, 1998

(51) Int. Cl.[7] .................................................. H01J 5/16
(52) U.S. Cl. .............................. 250/227.11; 250/227.28
(58) Field of Search .................... 250/227.11, 227.2, 250/227.21, 227.28, 227.29, 227.3, 201.1, 216; 356/152.1, 153, 73.1; 385/13

(56) References Cited

U.S. PATENT DOCUMENTS

| | | | |
|---|---|---|---|
| 4,692,611 | * 9/1987 | Hoogenboom | 250/227.2 |
| 4,737,624 | * 4/1988 | Schwarte | 250/227.2 |
| 4,739,161 | 4/1988 | Moriyama et al. | 250/277.11 |
| 4,801,799 | 1/1989 | Tromborg et al. | 250/227.31 |
| 5,202,558 | 4/1993 | Barker | 250/227.21 |
| 5,528,358 | 6/1996 | Bjorkman et al. | 356/141.1 |

OTHER PUBLICATIONS

Daniel S. Xamzow, Davide P. Baldwin, Stephan J. Weeks, Stanley J. Bajic, and Arthur P. D'Silva; "In Situ Determination of uranium in Soil by Laser Ablation–Inductively Coupled Plasma Atomic Emission Spectrometry"; Environ. Sci. Technol., vol. 28, No. 2, 1994; pp. 352–358.

* cited by examiner

Primary Examiner—John R. Lee
Assistant Examiner—Kevin Pyo
(74) Attorney, Agent, or Firm—George H Libman

(57) ABSTRACT

A displacement sensor includes a first optical fiber for radiating light to a target, and a second optical fiber for receiving light from the target. The end of the first fiber is adjacent and not axially aligned with the second fiber end. A lens focuses light from the first fiber onto the target and light from the target onto the second fiber.

16 Claims, 3 Drawing Sheets

FIBER OPTIC COUPLED OPTICAL SENSOR

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

There are many needs for sensors that optically couple a laser output to a target and also couple the reflected light from the target to a measuring device. The principal of operation of such devices is that light from a laser is coupled through an optical fiber and focused on a target. Light reflecting from (or emitted by) the target is coupled through an optical fiber to the measuring device. Subject to limitations of cost, size, and efficiency, such devices can be used for applications such as compact disk read or read/write devices, for spectral analysis of samples, and for measuring shock waves.

One approach to this problem is to use a single optical fiber to couple the light both to the target and, after reflection, back to a sensor. Such as system is shown in U.S. Pat. No. 4,154,529 of Dyott. There are several disadvantages to such a system. Since the light is sent and received on the same fiber, there is a major problem of signal mixing, that is, some of the outgoing light is detected as a return signal before it gets to the target. One major contributor to this phenomenon is Fresnel reflections which occur at every juncture where the light leaves the fiber and goes into air or some other medium with a different index of refraction. Typical Fresnel reflections are about 4% of the incident light per surface, so a connector junction where two fibers are butted together would have nearly 8% of the initial laser power mixed with the light returning from the target. Add that signal to other Fresnel reflections in the system and it is immediately apparent that this phenomenon can obscure any true return light from a system. There are many instances where the return light is less than 1% of the input light signal which would be swamped by the Fresnel reflections. In addition, the system for sending and collecting is much more complex and expensive than a dual fiber system. Since the input and return light are emanating from the same place, i.e. the end of the fiber that is coupled to the laser, separation equipment, and expensive optical components must be used and precisely aligned and maintained.

Another approach is to use two parallel optical fibers that are aligned perpendicular to a target, as shown in U.S. Pat. No. 4,739,161 of Moriyama et al. This patent does not suggest the use of a lens to concentrate the light, but keeps the fiber ends close enough to the target that sufficient reflected energy is received. Since the simple form of this invention (shown in FIGS. 10 and 11 of the '161 patent) does not have high sensitivity, the preferred embodiments use multiple optics and complicated signal processing to enhance sensitivity U.S. Pat. No. 4,801,799 of Tromborg et al. shows at FIG. 3 an alternative approach using two parallel optical fibers located at the focal point of a lens, so collimated light from a first fiber is transmitted from the lens to a reflective area on a vibrating surface, and reflected collimated light is received by a different portion of the lens and transmitted to the second fiber. The principle of operation of Tromborg's system is believed to be different from that stated by that patent, because movement of the vibrating stage towards and away from the lens would not change the focal position to 'b' and 'c' as shown in FIG. 3 of that patent, as the collimated light emanating from the reflective surface and passing through the lens will always return to the focal point 'a' of the lens. One explanation for the operation of Tromborg's system is that the vibrating mirror 34 is at an angle other than perpendicular to the path of light from fiber 14, so that the reflection is directed towards output fiber 16. In this event, the mirror or the optics assembly must be on a precise tilt stage in order to reflect the light back into the return fiber, and the reflective surface can only be a high quality mirror. This is a serious limitation in that a very narrow range of reflectors can be used and if that reflector is slightly misaligned either during operation or during setup, it will not work.

U.S. Pat. No. 5,202,558 of Barker shows as sensor that has a first optical fiber coupled from a laser to a graded index (GRIN) lens mounted axially in a housing. Light from the GRIN lens reflects off a target and is collected by a lens system axially mounted in the housing behind the GRIN lens. The lens system focuses the received light on an output optical fiber at the rear of the housing. The efficiency of this device is compromised by the shadow cast by the GRIN lens on the reflected light. The device is also incapable of being reduced in size as the housing must be large enough for most reflected light to pass around the GRIN lens. Furthermore, the GRIN lens has a short focal length compared to the collection lens. This short focal length is mandatory since the lens must capture the diverging light from the fiber, then focus it onto the target. Image magnification (in this case the diameter of the fiber is the image size) can be simply stated as the ratio of the focal lengths of the sending lens (GRIN) and the collecting lens. The Barker design will expand the image (spot diameter on the target) by approximately 6, which means that if a pair of 200 um diameter fibers were used, the spot on the target would be six times larger, or 1200 um diameter. The collecting lens takes that image diameter and tries to focus it into the 200 um receiving fiber and severely overfills the fiber by a factor of six. Using the area ratio of the diameter of the fiber versus the overfill diameter of 1200 um, the light collection is 36 times less efficient than the instant invention.

SUMMARY OF THE INVENTION

The present invention may comprise a sensor comprising a first optical fiber for receiving optical radiation from a radiation source and for radiating radiation transmitted through the fiber to a target. A second optical fiber receives radiation transmitted from the target and couples this radiation to a detector. The first output end of the first fiber is adjacent and not axially aligned with the second input end of the second fiber. A lens focuses the radiation from the first output end onto the target and focuses the radiation emitted by the target onto the second input end.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
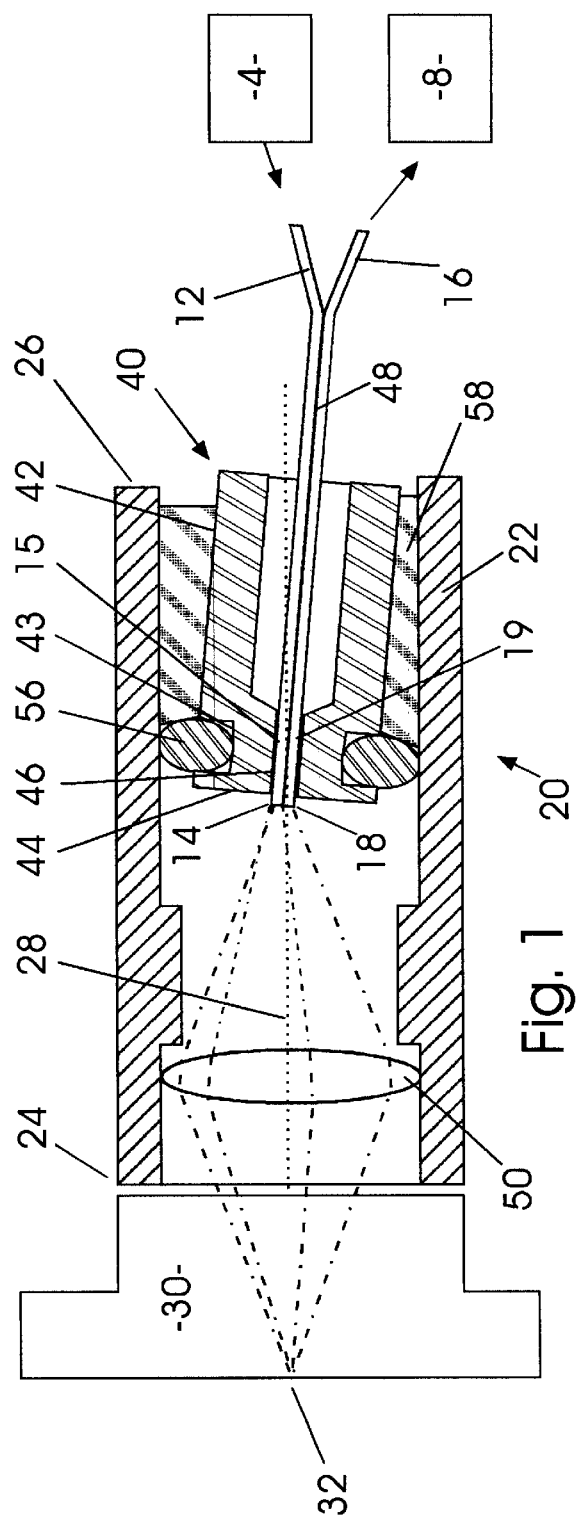
FIG. 1 shows a preferred embodiment of the invention used as a shock sensor.

As shown in FIG. 1, the invention includes a sensor 10 for transmitting optical radiation from a source 4 through a first optical fiber 12 to a target 30, and for receiving optical radiation from the target for transmission through a second optical fiber 16 to a detector 8. The optical radiation may be radiation of any wavelength capable of transmission through optical fibers and focussing by a lens. Preferably, it is radiation within the range extending from ultraviolet into the infrared. In one preferred embodiment, source 4 is a laser, the radiation is visible light, and detector 8 is any detector of change in applied visible light.

Sensor 10 preferably includes a case 20 having a generally cylindrical outer wall 22 enclosing a bore extending from a target end 24 to a fiber end 26. A lens 50, which may comprise a single lens or a plurality of lenses, is fastened within target end 24 of the case bore. A fiber housing 40 containing adjacent first and second optical fibers 12, 16 is adjustably positioned within fiber end 26 and fastened in place as discussed hereinafter.

A target 30 is mounted at target end 24 of case 20. In order for the energy which displaces target 30 to be concentrated at a spot 32 on target 30, the light from fiber end 14 is focused by lens 50 on spot 32 through lens assembly 50, and the reflected light from spot 32 is focused on fiber end 18. Movement of spot 32 toward lens 50, which may be caused by impinging target 30 with a high energy pulse, causes a perturbation in the received light at detector 8.

To accomplish this result, a portion 15 of first optical fiber 12 extending from output end 14 is held parallel to and adjacent a portion 19 of second optical fiber 14 extending from input end 18. This construction may be provided for as shown in FIG. 1, where fiber housing 40 has a generally cylindrical outer wall 42 enclosing an axial bore 46 having a diameter at end 44 of approximately the combined diameters of fibers 12 and 16. When these fibers are placed within bore 46, then the portions of fibers 15, 19 are parallel to each other and housing axis 48.

To ensure that light from source 4 is focused on spot 32, lens 50 is a positive lens, i.e., one which focuses to a point, and output end 14 is placed a greater distance from lens 50 than its focal length. This device would not be efficient if the point source of light from first fiber 12 was transmitted along a path perpendicular to target 30, as the principle of reversibility would place the energy from target 30 back on the source, fiber end 14, and not adjacent fiber end 18. Accordingly, the structure must be modified in order that the concentrated light through lens assembly 50 is neither shadowed nor misdirected.

As shown in FIG. 1, housing 40 is mounted within case 20 such that housing axis 28 is at a slight angle with respect to case (and lens) axis 28. Light striking at an angle at an off-center location on lens 50 is focused on spot 32, and light emanating from spot 32 strikes another off-center location on lens 50 and is focused on second fiber 18. The ends 14 and 18 of fibers 12 and 16 are preferably adjacent case and lens axis 28 to minimize longitudinal aberrations and coma that results from their being off-axis.

To ensure the proper alignment of housing 40 within case 20, a steady-state light is applied from source 4 and the amplitude is detected at detector 8. Housing 40 is moved within case 20 until the amplitude is maximized, and then housing 40 is fixed in position with respect to case 20.

To provide inexpensive structure to accomplish the aforementioned alignment, outer surface 42 of housing 40 may have a circumferential groove 43 adjacent end 44. A resilient o-ring 56 in groove 43 slides along the inner surface of the bore in case 20. The o-ring may be replaced by any frictional boss which maintains the fiber pair housing in central alignment with the bore. When the position of housing 40 within case 20 has been adjusted to maximize the signal at detector 8 from a source 4, the friction of o-ring 56 will maintain housing 40 on this optimum position until an epoxy 58 or other quick setting filler can be placed between housing 40 and case 20 and subsequently harden.

In cases where the invention may need to be refocused due to a change in target-lens distance, the filler may be replaced by a mechanical holding device such that it holds the back of the fiber holder shaft in alignment for optimal signal collection.

It should be appreciated that this invention may be made very small. In one recent test, the length of case 20 was 10 mm and the outer diameter was 5 mm. One small probe had a body diameter of 3.5 mm and a 7 mm length and used a 2.5 mm diameter lens. The diameter of bore 46 of housing 40 at end 44 was 0.5 mm, and each of optical fibers 12 and 16 had a diameter of 200 $\mu$m.

Among the advantages of this design are the fact that its few components have a low material cost and easy fabrication. In addition, the sensor can be prefocused for plug-in use with a predetermined target in a variety of applications. It also can easily be hermetically sealed and fabricated with a variety of materials such as brass, stainless steel, and plastics. System efficiency is increased because it focuses the radiant energy to a very small spot on the target.

Optical fiber size and placement is easily controlled by the size and placement of the bore or bores in housing 40. For the illustrated configuration, larger fibers may be utilized with a larger bore. However, other configurations which have ends 14 and 18 adjacent on another and not casting a shadow on each other are also possible. For example, separate bores could be provided for each of fibers 12 and 16. If these bores were each parallel to axis 48, operation would be similar to the embodiment of the Figure. However, these bores could also be at an angle to each other and to axis 48, so long as their relationship with lens assembly 50 permits the output of first fiber 12 to be focused first on spot 32 and then on the end of second fiber 16.

Because of the unique arrangement of the fibers 12, 16, and lens 50, target 30 does not have to be a highly reflective surface and may disperse the reflected light. However, because the light from fiber 14 is focused on spot 32, whatever reflected light falls on lens 50 will be directed back to second fiber 16. This system can send and collect light off of any target, e.g. aluminum foil, liquids, paper, and is not limited to mirror surfaces as is the Tromborg device.

This invention has been observed to have much greater efficiency than the GRIN device of Barker, referenced above. Comparison tests were made using a reflective surface that was adjusted to maximize the return signal. For each device, the input laser 4 was a frequency doubled Nd:YVO laser operating with an output power of 1 mW injected into the send fiber 12. For the first test, the commercially available Valyn Fiber Optic Probe (Valyn International, Albuquerque, N.Mex.), the subject of U.S. Pat. No. 5,202,558, had a standard 50 $\mu$m input fiber and a 300 $\mu$m output fiber. (The device is designed to have a smaller input fiber to more accurately focus the transmitted spot. However, the small fiber design makes it very difficult to couple larger amounts of light from the diode through the fiber.) The return signal was 20 $\mu$W, or 2% system efficiency.

In a second test, this device had 200 μm input and output fibers. This test yielded a return signal of 0.19 μW, or 0.19% efficiency. However, the test embodiment of the invention, using 200 μm input and output fibers, had a return signal of 180 μW, or an efficiency of 18%.

Figure 2:
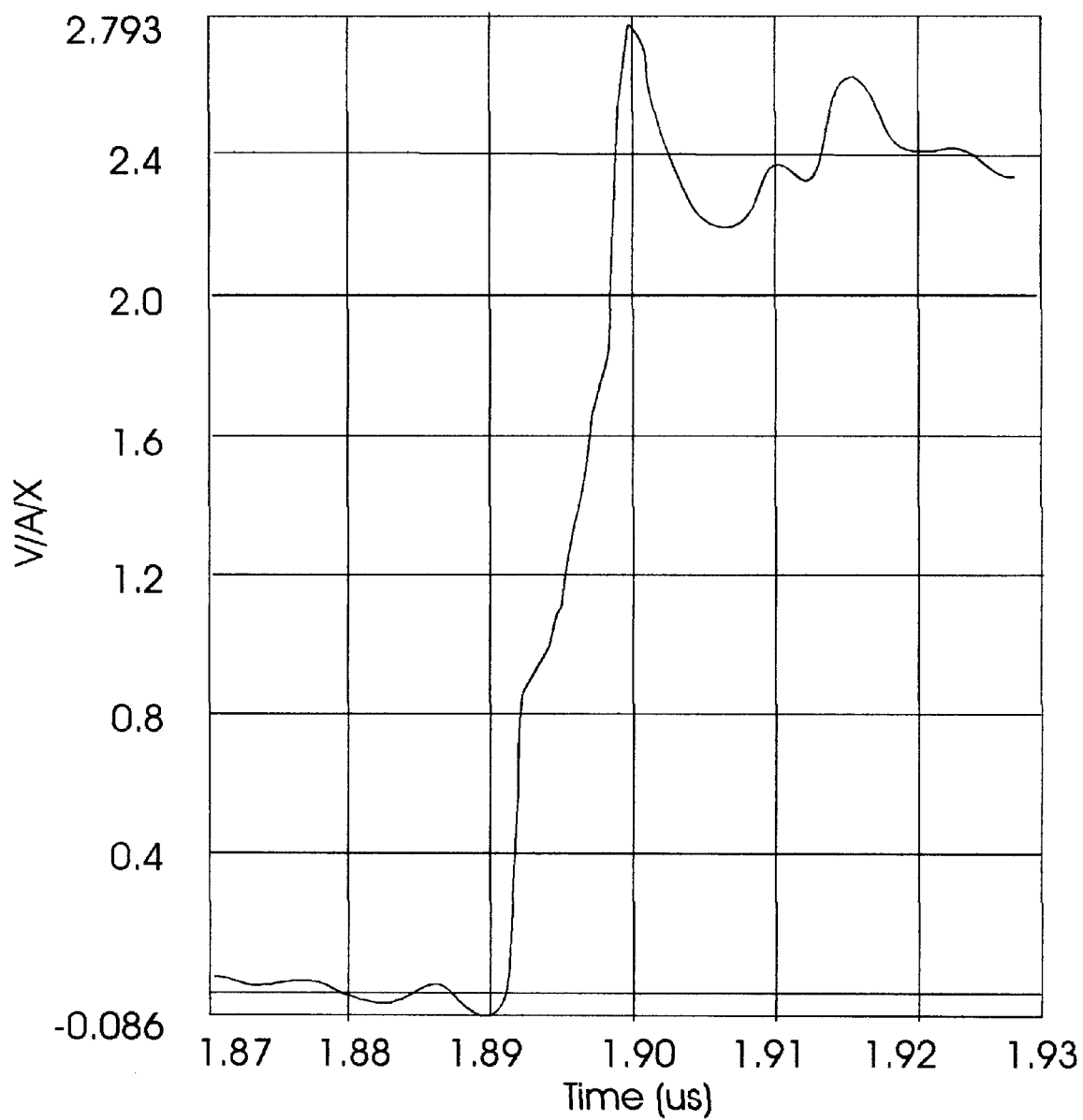
FIG. 2 shows test results from the preferred embodiment.

FIG. 2 shows the velocity profile of a surface containing spot 32 moving toward the probe over a distance of about 1 μm, where the vertical axis is in km/s. This movement resulted from hitting target 30 with a high intensity X-ray pulse. The GRIN device would not be able to make such a measurement because the smaller input fiber and the plastic lenses darken and fluoresce during the X-ray pulse.

Figure 3:
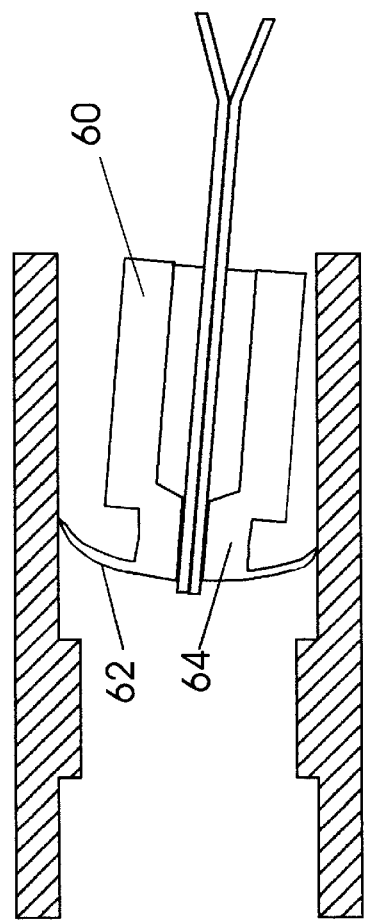
FIG. 3 shows an alternative embodiment of the invention.
Figure 4A:
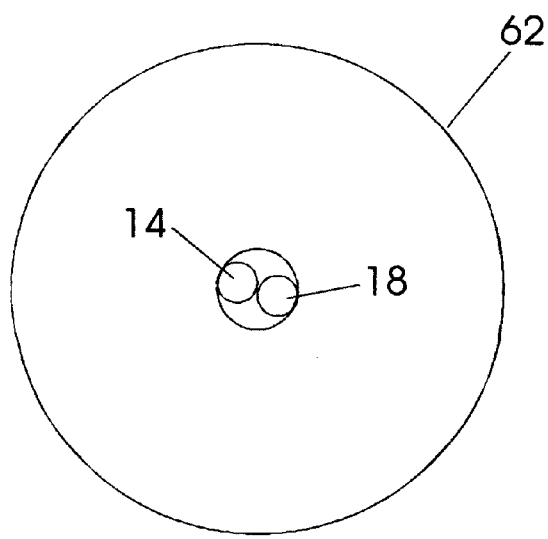
FIGS. 4a–4c show alternative details of the alternative embodiment of FIG. 3.
Figure 4B:
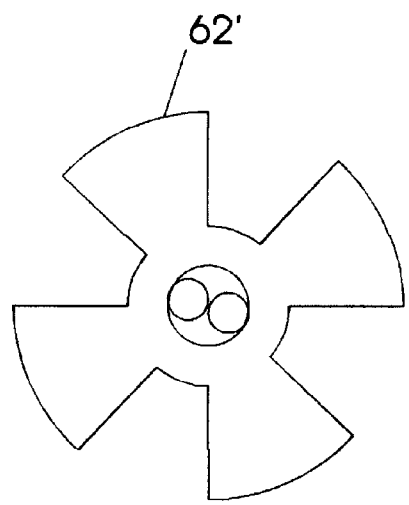
Figure 4C:
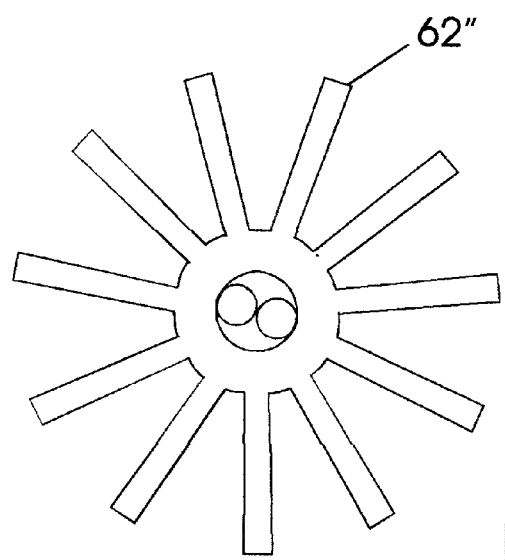

FIG. 3 shows a second embodiment of fiber housing 60 which replaces o-ring 56 of the embodiment of FIG. 1 with a flexible flange 62 extending preferably from end 64 of housing 60. The diameter of flange 62 is slightly greater than the diameter of the bore of case 20, so the natural springiness of flange 62 will hold housing 60 in position as discussed above. Flange 62 may have any cross-section shape, such as circle 62 (FIG. 4a), portions of a circle 62' (FIG. 4b), or spokes 62" (FIG. 4c), so long as there is sufficient friction with case 20 to hold housing 60 in position.

While lens 50 is indicated as being symmetrical about axis 28, it is also contemplated that some or all of the lens which make up assembly 50 may be asymmetrical with respect to axis 28.

The invention has been illustrated utilizing a target 30 that moves under the impact of a high energy beam. It is also contemplated that target 30 could be a material that is vaporized by focussed energy from first optical fiber 12. Since a large area of the lens is used to focus the outgoing laser light, high energy radiation may be transmitted without fear of damaging the lens, due to the spreading of the radiation over a large area of the lens. If the frequency of the transmitted beam as received by fiber 16 is filtered out, the spectrum of the resulting vapor may be analyzed at detector 8.

The particular sizes and equipment discussed above are cited merely to illustrate a particular embodiment of this invention. It is contemplated that the use of the invention may involve components having different sizes and shapes as long as the principle of having light that is focused on a target and also on an output fiber, without having a shadow cast by one fiber on the other, is followed. For example, a combination of fiber optic diameters can be used for optimal performance: a small diameter fiber optic can be used for the sending fiber which will allow the lens to focus a smaller and brighter spot on the target, while the return fiber can be quite large which gives the advantages of a larger tolerance zone for focusing on the target, and can collect more light from the target due to the larger core diameter of the fiber. It is intended that the scope of the invention be defined by the claims appended hereto.

What is claimed is:

1. A sensor comprising:
   a first optical fiber having a first input end for receiving optical radiation from a radiation source and a first output end for radiating radiation transmitted through said fiber;
   a target for emitting radiation when illuminated by radiation from the source;
   a second optical fiber having a second input end for receiving radiation and a second output end for coupling radiation transmitted through said second fiber to a detector, said first output end being adjacent and not axially aligned with said second input end; and
   lens means for focusing radiation from said first output end onto said target and for focusing radiation emitted by said target in response to said first output end onto said second input end.

2. The sensor of claim 1 wherein said lens means comprises a positive lens.

3. The sensor of claim 1 wherein said first output end of said first optical fiber is parallel to said second input end of said second optical fiber.

4. The sensor of claim 3 further comprising:
   a case having a case bore extending from a target end on one side of said case to a fiber end on another side of said case, said lens means being fastened within said case bore adjacent said target end; and
   a fiber housing having a housing bore extending through said housing for holding said fibers.

5. The sensor of claim 4 wherein said case bore extends along a case axis, and said target is aligned with said case axis.

6. A sensor comprising:
   a first optical fiber having a first input end for receiving optical radiation from a radiation source and a first output end for radiating radiation transmitted through said fiber;
   a target for emitting radiation when illuminated by radiation from the source;
   a second optical fiber having a second input end for receiving radiation and a second output end for coupling radiation transmitted through said second fiber to a detector, said first output end being adjacent and not axially aligned with said second input end;
   lens means for focusing radiation from said first output end onto said target and for focusing radiation emitted by said target onto said second input end;
   a case having a case bore extending from a target end on one side of said case to a fiber end on another side of said case, said lens means being fastened within said case bore adjacent to said target end, wherein said case bore extends along a case axis, and said target is aligned with said case axis; and
   a fiber housing having a housing bore extending through said housing for holding said fibers, wherein said first and second fibers extend through said housing bore parallel to a fiber axis, said fiber axis not being parallel to said case axis.

7. The sensor of claim 6 wherein said fiber housing fits loosely within the target end of said case bore, said system further comprising a resilient spacer extending between said fiber housing and said case bore, said resilient spacer permitting said fiber housing to be adjustably positioned within said case bore.

8. The sensor of claim 7 further comprising means for rigidly fastening said fiber housing with respect to said case housing.

9. The sensor of claim 8 wherein said means for rigidly fastening consists of epoxy extending from said fiber housing to said case housing.

10. The sensor of claim 8 wherein said lens means consists of a positive lens.

11. The sensor of claim 1 wherein said target has a reflective surface, and movement of said target causes a change in the reflected radiation transmitted to said second input end.

12. The sensor of claim 1 wherein said target emits radiation when struck by radiation from said first output end, and the emitted radiation is focussed on said second input end.

13. The sensor of claim 1 wherein said optical radiation is within the range of infrared to ultraviolet light.

14. The sensor of claim 11 wherein said optical radiation is within the range of infrared to ultraviolet light.

15. The sensor of claim 12 wherein said optical radiation is within the range of infrared to ultraviolet light.

16. The sensor of claim 5 wherein said lens is symmetrical about said case axis, and wherein said first output end of said first optical fiber and said second input end of said second optical fiber are adjacent to each other and said case axis.

* * * * *